United States Patent [19]

Teigen et al.

[11] Patent Number: 5,154,468
[45] Date of Patent: Oct. 13, 1992

[54] POLYMERIC ARTICULATED BEVERAGE BODY DOOR

[75] Inventors: Jerry T. Teigen, New Richmond, Wis.; Paul A. Villella, St. Paul, Minn.

[73] Assignee: Dorso Trailer Sales Inc., St. Paul, Minn.

[21] Appl. No.: 765,173

[22] Filed: Sep. 25, 1991

Related U.S. Application Data

[63] Continuation-in-part of Ser. No. 675,657, Mar. 27, 1991.

[51] Int. Cl.⁵ .............................. B60P 3/00; B60J 5/06
[52] U.S. Cl. .................................. 296/24.1; 296/155;
 52/403; 52/420; 52/436; 52/589; 52/593;
 52/743; 160/41; 160/133; 160/231.2; 160/236;
 403/319
[58] Field of Search ............... 296/155, 100, 98, 24.1;
 160/41, 133, 231.1, 231.2, 232, 235, 236;
 403/317, 319; 52/403, 420, 436, 588, 589, 593, 743

[56] References Cited

U.S. PATENT DOCUMENTS

| | | | |
|---|---|---|---|
| 1,936,300 | 11/1933 | Guss | 160/133 |
| 2,951,533 | 9/1960 | Lucas et al. | 160/40 |
| 3,056,451 | 10/1962 | Federline et al. | 160/201 |
| 3,078,917 | 2/1963 | Recchione | 160/40 X |
| 3,129,752 | 4/1964 | Whiting | 160/201 |
| 3,135,544 | 6/1964 | Mickey et al. | 296/24.1 |
| 3,148,724 | 9/1964 | Chieger et al. | 160/231.2 X |
| 3,424,222 | 1/1969 | Stoner et al. | 160/40 |
| 3,850,465 | 11/1974 | Hill et al. | 292/231 |
| 3,894,571 | 7/1975 | Hinchliff | 160/201 |
| 4,114,945 | 9/1978 | Lutz | 16/93 R |
| 4,219,067 | 8/1980 | Hurst | 160/133 |
| 4,343,340 | 8/1982 | Paule | 160/236 X |
| 4,601,953 | 7/1986 | Haffer | 160/236 X |
| 4,611,848 | 9/1986 | Romano | 296/98 |
| 4,747,441 | 5/1988 | Apolzer et al. | 296/100 X |
| 4,785,494 | 11/1988 | Adamski | 296/155 X |
| 4,786,099 | 11/1988 | Mount | 296/98 |
| 4,800,619 | 1/1989 | Hudak | 160/201 X |
| 4,889,381 | 12/1989 | Tamblyn et al. | 296/98 |
| 4,924,932 | 5/1990 | Esnault | 160/232 X |
| 4,972,894 | 11/1990 | Machill | 160/41 X |

FOREIGN PATENT DOCUMENTS

| | | | |
|---|---|---|---|
| 2507240 | 9/1976 | Fed. Rep. of Germany | 160/133 |
| 2056 | 3/1990 | PCT Int'l Appl. | 296/98 |
| 181711 | 9/1962 | Sweden . | |

Primary Examiner—Margaret A. Focarino
Assistant Examiner—Andrew C. Pike
Attorney, Agent, or Firm—Kinney & Lange

[57] ABSTRACT

An articulated door covers storage bays of a beverage body. The articulated door is formed by engaging a plurality of polymeric panel sections into a sequence such that a hinge is formed between adjoining panel sections. Each hinge allows adjacent panel section to be positioned at varying angles with respect each other. A resilient sealant bond between adjacent panel sections is made at spaced locations along each hinge. The articulated door is guided between an open position and a closed position by a door guiding track comprised of a left channel facing a right channel across a door opening. The sequence of panel sections is slidably positioned in the door guiding track by having a left end of each panel section extending into the left channel and a right end of each panel section extending into the right channel.

13 Claims, 9 Drawing Sheets

POLYMERIC ARTICULATED BEVERAGE BODY DOOR

CROSS REFERENCE TO RELATED APPLICATION

This Application is a Continuation-in-Part of application Ser. No. 07/675,657, filed Mar. 27, 1991.

BACKGROUND OF THE INVENTION

The present invention relates to articulated doors for use in beverage bodies. More specifically, the present invention relates to an articulated door for use in a beverage body wherein the articulated door is formed from a sequence of engagable polymeric panel sections.

Beverage trailers and trucks employing beverage bodies have long been used to deliver beverages to various sorts of retailers. Articulated doors are typically used on both sides of a beverage body to permit access to individual storage bays where the beverages are stored. Under normal use, these doors are opened many times during the day as the driver delivers beverages to retailers along his route. While a general purpose delivery truck may use one roll-up door at the rear of the truck, a typical beverage body may use ten or more doors. Therefore, any disadvantage associated with a particular door design is multiplied many times when that design is employed in a beverage body.

Beverage bodies have typically employed articulated doors that are formed from a sequence of solid aluminum panel sections. These panel sections are formed with interlockable edges. Usually an aluminum panel section will have a first interlockable edge with an attached cylindrical structure and a second interlockable edge opposite the first edge with an attached cylindrical structure having a radius larger than the radius of the cylindrical structure attached to the first edge. The smaller cylindrical structure of a panel section is placed within the larger cylindrical structure of an adjacent panel section thereby forming a joint that allows the two adjacent panel sections to be positioned at varying angles with respect to each other. The smaller cylindrical structure also includes a hollow center in which rollers are inserted. Therefore, every joint typically has a corresponding pair of rollers.

To guide an articulated aluminum door between an open position and a closed position, a door guiding track is required. A typical door guiding track is comprised of a pair of channels, with each channel having a pair of channel members facing each other across a gap in which the rollers are inserted. These channel members also may include track liners, often formed of stainless steel, to absorb vibrational energy and to reduce friction between the rollers and the channel members.

There are several problems that arise from using this type of articulated aluminum door in a beverage body. When doors of this type are new they typically work fine. However, as the beverage body is used, the door frame can be deformed by backing into loading docks and driving over rough roads and curbs. When the door frame is deformed, the door guiding track becomes out of square and the door will either jam or become very difficult to raise and lower.

As the beverage body is transported over roads with the articulated doors closed, the doors vibrate in their tracks. This vibrational energy is absorbed by the rollers and channel members as they vibrate against each other. This forms flat spots on the rollers and indentations in the channel members at the points where the rollers contact the channel members. As these indentations grow in size, the space surrounding the rollers increases, allowing the vibrations to increase in intensity and thereby increasing the rate at which the rollers and channel members deteriorate. These indentations also contribute to the door becoming more difficult to raise and lower.

As a door becomes more difficult to raise and lower, the rollers and channel members are lubricated. The lubrication eventually picks up dust and dirt which further accelerates the deterioration of the rollers and door guiding track. A delivery person will progressively exert more force to open and close the door as this deterioration cycle continues. Eventually a point will be reached when the delivery person will no longer be able to move the door. At this point the beverage body is brought back to the warehouse where typically a forklift is used to unjam the door, which usually destroys the door.

An articulated door and door guiding track that is constructed from self-lubricating materials and does not employ rollers would be resistant to deterioration and track alignment problems and would therefore be very desirable.

Because aluminum is not a resilient material, collisions with an articulated aluminum door usually result in a partial or complete destruction of the door. This can happen in a warehouse, where forklifts maneuver around and load beverage bodies, in an on-street accident, or from within the beverage body itself if the beverages contained therein should tip over. While the door can sometimes be repaired by replacing the impacted panel section, often adjacent panels will be deformed from the force transmitted through the interlocking edges.

When using beverage bodies in cold climates, the storage bays must be heated to prevent the beverages from freezing. Typically this is accomplished by circulating heated engine coolant from the tractor through the floor of the beverage body. Because aluminum is a highly thermo-conductive material, a layer of insulation must be added to the inner surface of an articulated aluminum door to retain the heat in the beverage body. This adds significant expense, complexity, and weight to articulated aluminum doors used in beverage bodies.

Another problem associated with the use of beverage bodies in cold climates results from the salt and sand that is applied to road surfaces to melt ice and improve traction. The salt and sand work their way into the joints that connect adjacent panel sections, where they corrode and wear down the aluminum surfaces that form the joint. While the door can be steam cleaned, the joint has usually been damaged by the time this is done. Eventually the joint will lock up and the affected panel sections must be replaced.

Because of the weight of an articulated aluminum door, a counterbalance device is typically used to assist the delivery person in opening and closing the door. This device is usually located above the storage bay. The counterbalance adds weight and complexity to the beverage body and decreases the available space left to transport beverages.

An articulated door comprised of panel sections formed from a lightweight, high insulation, wear resistent, corrosion resistent, and resilient material would be very desirable.

SUMMARY OF THE INVENTION

The present invention provides an articulated door and door guiding track for use in beverage bodies. To form an articulated door, a plurality of polymeric panel sections are engaged in a sequence of panel sections such that a hinge is formed between adjacent panel sections. Resilient bonding means located at each hinge absorbs vibration and prevents adjacent panel sections from sliding apart. Each hinge allows adjacent panel sections to be positioned at varying angles with respect each other.

The articulated door is guided between an open position and a closed position by a door guiding track. The door guiding track is comprised of a left channel facing a right channel across a door opening.

The sequence of panel sections are slidably positioned in the door guiding track with a left end of each panel section extending into the left channel and a right end of each panel section extending into the right channel.

The present invention provides an articulated door that is resilient, lightweight, wear resistent, corrosion resistent, self-lubricating, and has a high insulation value. The present invention does not employ rollers to guide the door between the open position and the closed position and is relatively tolerant of door frame misalignment.

DETAILED DESCRIPTION OF THE PREFERRED EMBODIMENTS

The present invention is an articulated door and door guiding track for use in beverage bodies. The articulated door is formed from a plurality of polymeric panel sections and is guided between an open position and a closed position by a door guiding track.

Figure 1:
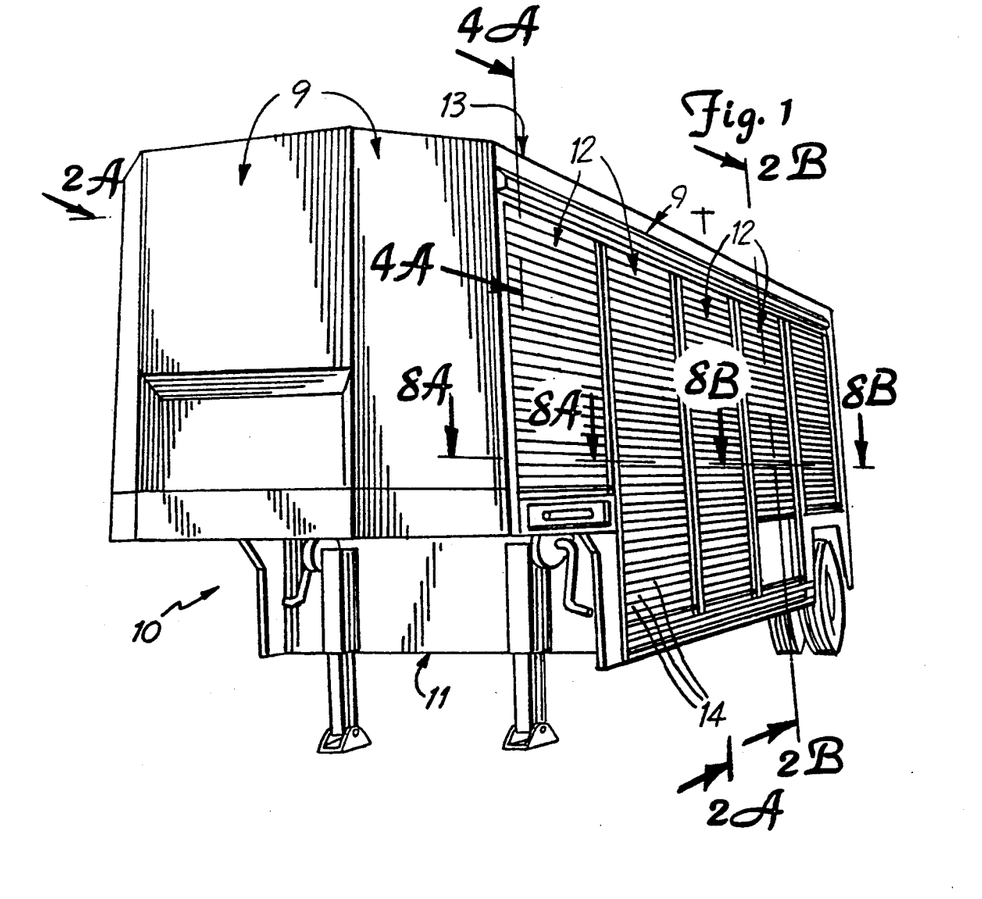
FIG. 1 is a perspective view of a beverage body having articulated doors, with each articulated door supported by a door guiding track, in accordance with the present invention.

FIG. 1 is a perspective view of beverage body 10. Beverage body 10 has floor 11, roof 13, walls 9, and a plurality of door openings in which articulated doors 12 are positioned. Beverage body 10 has an interior which is divided into individual beverage storage bays that are accessible by articulated doors 12. Articulated doors 12 are formed by engaging polymeric panel sections 14 into a sequence. A typical door of this type is 87 inches tall and 54 inches wide.

Figure 2A:
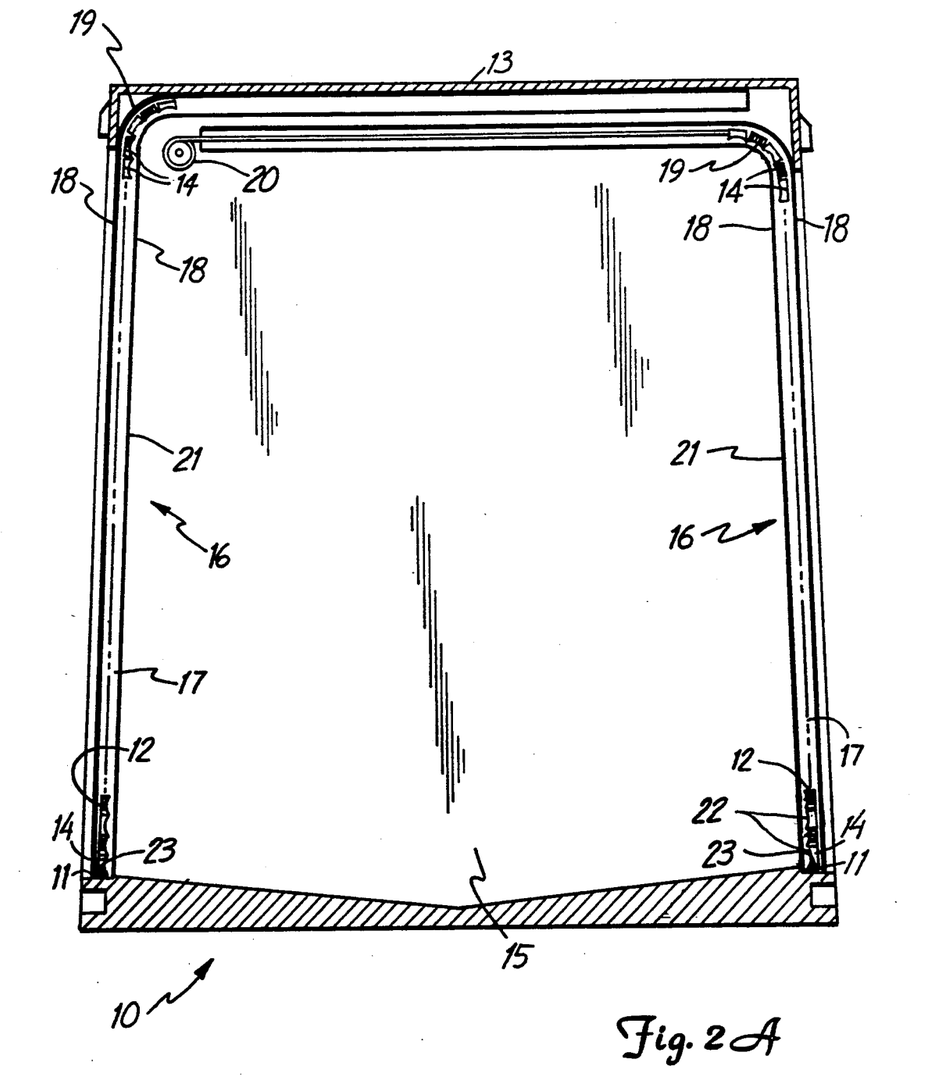
FIG. 2A is a transverse sectional view taken along line 2A—2A of FIG. 1 showing two articulated doors installed in a beverage body.

FIG. 2A is a transverse sectional view taken along line 2A—2A of FIG. 1 showing two articulated doors 12 installed in beverage body 10. Articulated doors 12 provide access to beverage storage bay 15 and are formed by engaging panel sections 14 into a sequence (this view does not show every panel section 14 required to form articulated door 12). Every alternate panel section 14 is provided with a pair of slider plugs 22. A bottom panel section 14, located adjacent to floor 11 of beverage body 10 when articulated door 12 is in the closed position, contains seal 23.

Articulated doors 12 are supported and guided by door guiding track 16. Each door guiding track 16 is comprised of a pair of channels 21, which face each other across the door opening. In this figure, only one channel 21 of each door guiding track 16 is visible. Each channel 21 includes channel members 18, which face each other across gap space 17, and curved segment 19, which is provided to guide articulated door 12 above beverage storage bay 15 and along roof 13 when door 12 is moved to the opened position. In one embodiment, articulated door 12 is connected to counterbalance 20 to assist the delivery person in moving articulated door 12 between the open position and the closed position. However, because of the light weight of articulated door 12, in another embodiment counterbalance 20 is not used.

Figure 2B:
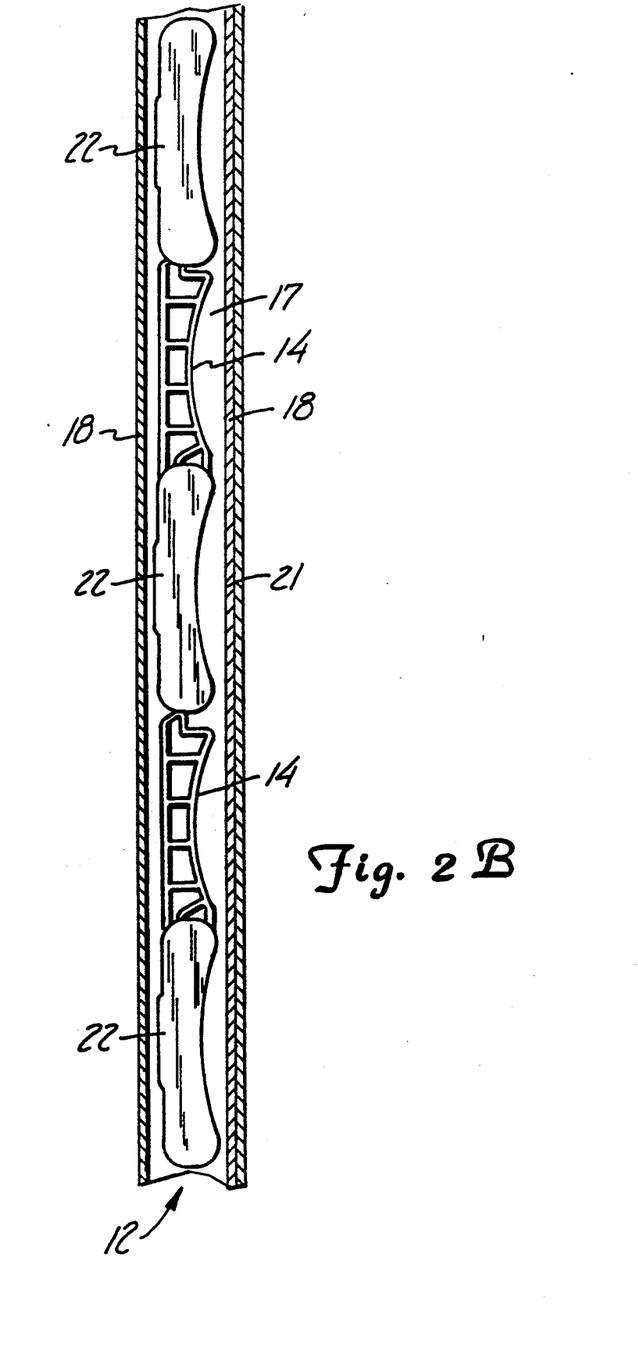
FIG. 2B is a sectional view taken along line 2B—2B of FIG. 1 showing a portion of an articulated door.

FIG. 2B is an enlarged view of a section of the left articulated door 12 of FIG. 2A. Every alternate panel section 14 is provided with a slider plug 22. Because slider plug 22 is wider than panel section 14, articulated door 12 is supported and guided by a contact between channel members 18 and slider plugs 22. The height of slider plug 22 is larger than the height of panel section 14. This allows slider plug 22 to partially cover the hinge between adjacent panel sections. This holds articulated door 12 together by preventing adjoining panel sections from sliding apart.

Figure 3A:
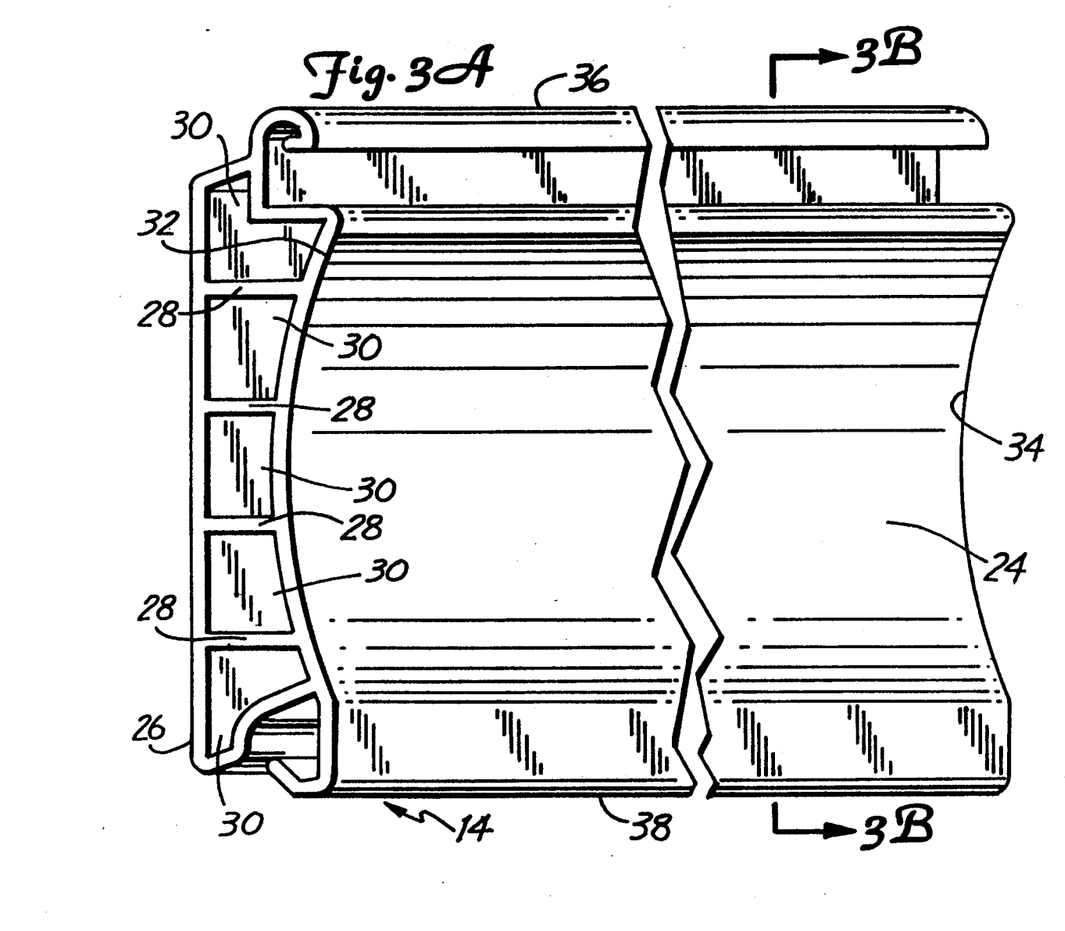
FIG. 3A is a perspective view of a panel section, a plurality of which engaged in a sequence forms the articulated door of FIG. 1.

FIG. 3A is a perspective view of polymeric panel section 14. When a plurality of panel sections 14 are engaged in a sequence, they form articulated door 12 of FIG. 1. Panel section 14 has curved inner surface 24 and flat outer surface 26 Curved inner surface 24 has a preferred radius of 2.099 inches. This facilitates the movement of articulated door 12 through the curved section 19 of door guiding track 16 of FIG. 2A. Flat outer surface 26 is provided so that articulated door 12 can be easily painted with a beverage company's logo using a process such as silkscreening. Curved inner surface 24 and flat outer surface 26 are connected to each other by a plurality of parallel partitions 28. Plurality of parallel partitions 28 divides a space between flat outer surface 26 and curved inner surface 24 into a plurality of parallel compartments 30. This increases the strength and insulation properties of panel section 14 while decreasing the weight of the panel section.

Figure 3B:
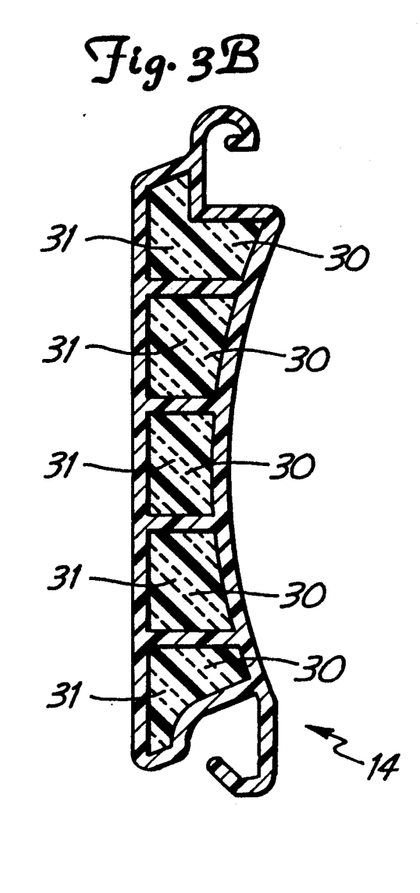
FIG. 3B is a transverse sectional view taken along line 3B—3B of FIG. 3A showing a panel section with a plurality of compartments which contain insulation.

An articulated door formed from a plurality of panel sections 14 will have an insulation value approximately twice that of an insulated aluminum door of the prior art. Therefore, for most applications, the articulated door of the present invention will not require any additional insulation. However, if a beverage body is to be used in extremely cold climates, or an articulated door is to be used in an application where a high insulation value is crucial, panel section 14 can be easily and inexpensively provided with insulation. FIG. 3B is a transverse sectional view taken along line 3B—3B of FIG. 3A. In an alternative embodiment shown in FIG. 3B, the plurality of parallel compartments 30 of panel section 14 are filled with urethane foam insulation 31. This greatly enhances the insulation value of panel section 14 without changing the external dimensions of the panel section or an articulated door constructed therefrom.

In FIG. 3A, panel section 14 has right end 32 and left end 34 (named with respect to viewing a panel section 14 in an articulated door 12 from an exterior of beverage body 10 of FIG. 1). Right end 32 and left end 34 expose the plurality of parallel compartments 30. Panel section 14 also includes top hook edge 36 and bottom receptive edge 38, which engage with adjoining panel sections 14 to form articulated door 12 of FIG. 1. Ideally, a distance between top hook edge 36 and bottom receptive edge 38, i.e., the height of panel section 14, is as large as possible. As this distance becomes larger, fewer panel sections 14 are required to form articulated door 12, thereby decreasing the cost of the door. However, as the height of the panel sections increases, so must the radius of curved section 19 of door guiding track 16 of FIG. 2A. Therefore, the preferred height of panel section 14 is 2.430 inches to facilitate an articulated door 12 formed from an acceptable number of panel sections 14 while maintaining an acceptable radius for curved section 19 of door guiding track 16.

Panel section 14 is formed by an extrusion process using a material that is a polymer blend of polyphenylene oxide and high impact polystyrene with triarylphosphate esters added to retard fire. Different variants of the polymer blend can be used based on the climate where the articulated door will be used. Compared to aluminum, the polymer blend used in the present invention has a high insulation value and is lightweight, resilient, self-lubricating, wear resistent, and corrosion resistent. Parallel partitions 28, curved inner surface 24, flat outer surface 26, top hook edge 36, bottom receptive edge 38, and other extruded walls are formed with a thickness of 0.05 inches.

Figure 4A:
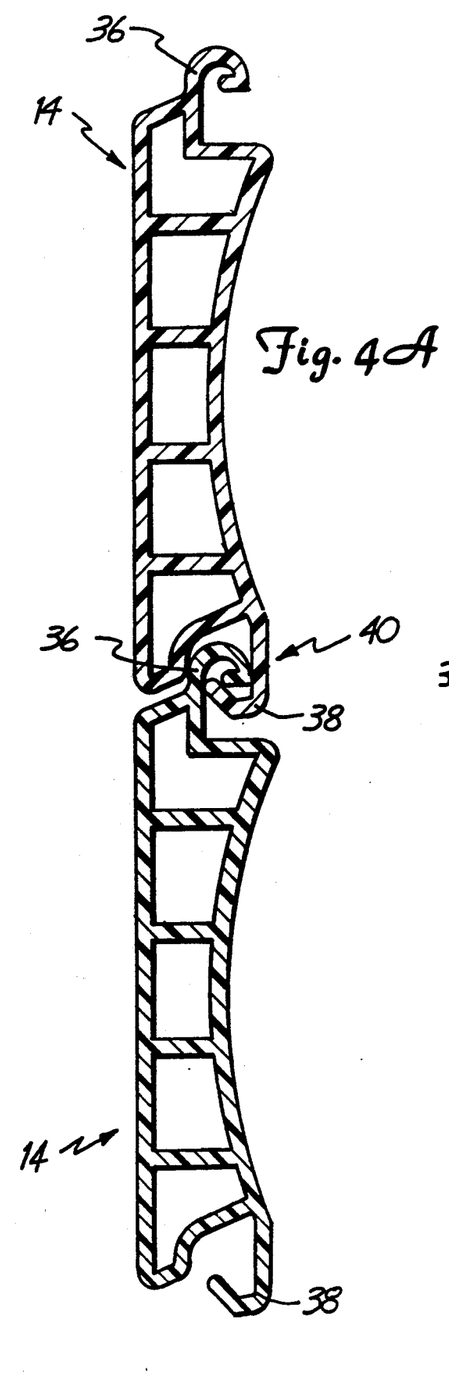
FIG. 4A is a sectional view taken along line 4A—4A of FIG. 1 showing a pair of adjacent engaged panel sections positioned in-line with each other.

FIG. 4A is a view of a pair of adjacent engaged panel sections 14 that form a segment of the articulated door 12 of FIG. 1. The two panel sections 14 are shown positioned with respect to each other as they would be when the door is in the closed position. Top hook edge 36 is engaged with bottom receptive edge 38 to form hinge 40, with top hook edge 36 positioned generally within bottom receptive edge 38. Hinge 40 allows the pair of adjacent engaged panel sections 14 to be positioned at varying angles with respect to each other.

Figure 4B:
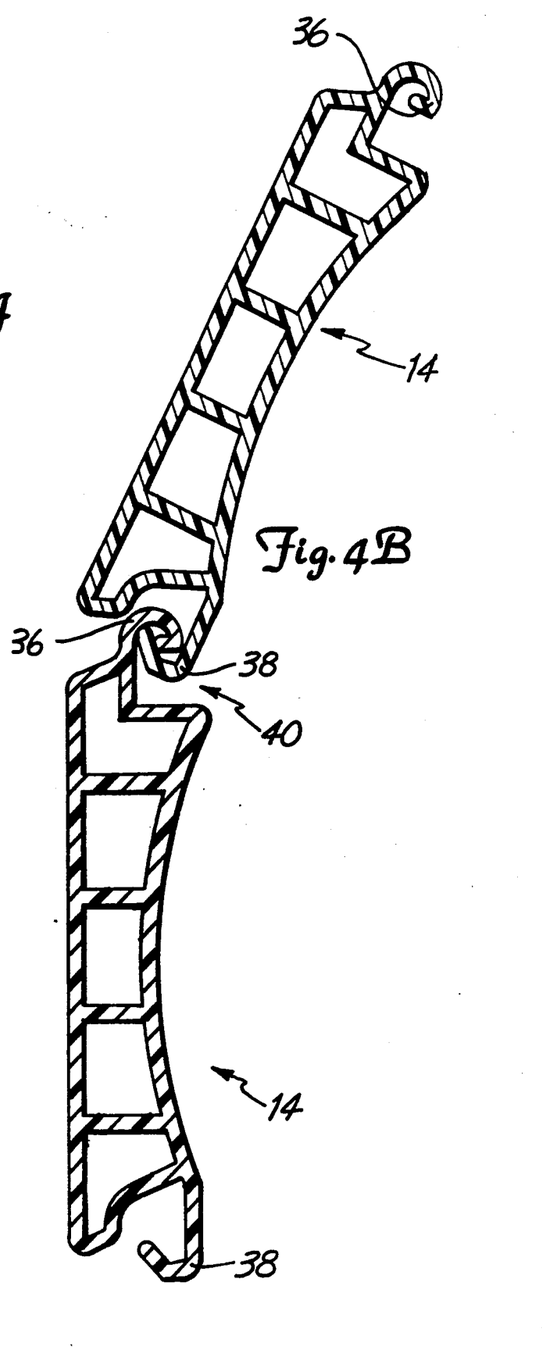
FIG. 4B is a view similar to FIG. 4A, except that the pair of adjacent engaged panel sections are positioned at an angle with respect to each other, in accordance with the door of FIG. 1 being moved between an open position and a closed position.

FIG. 4B is a view similar to FIG. 4A, with the adjacent panel sections 14 positioned at an angle with respect to each other. Two adjacent panel sections 14 would be positioned in such a way as they move through curved section 19 of door guiding track 16 of FIG. 2A.

Figure 5:
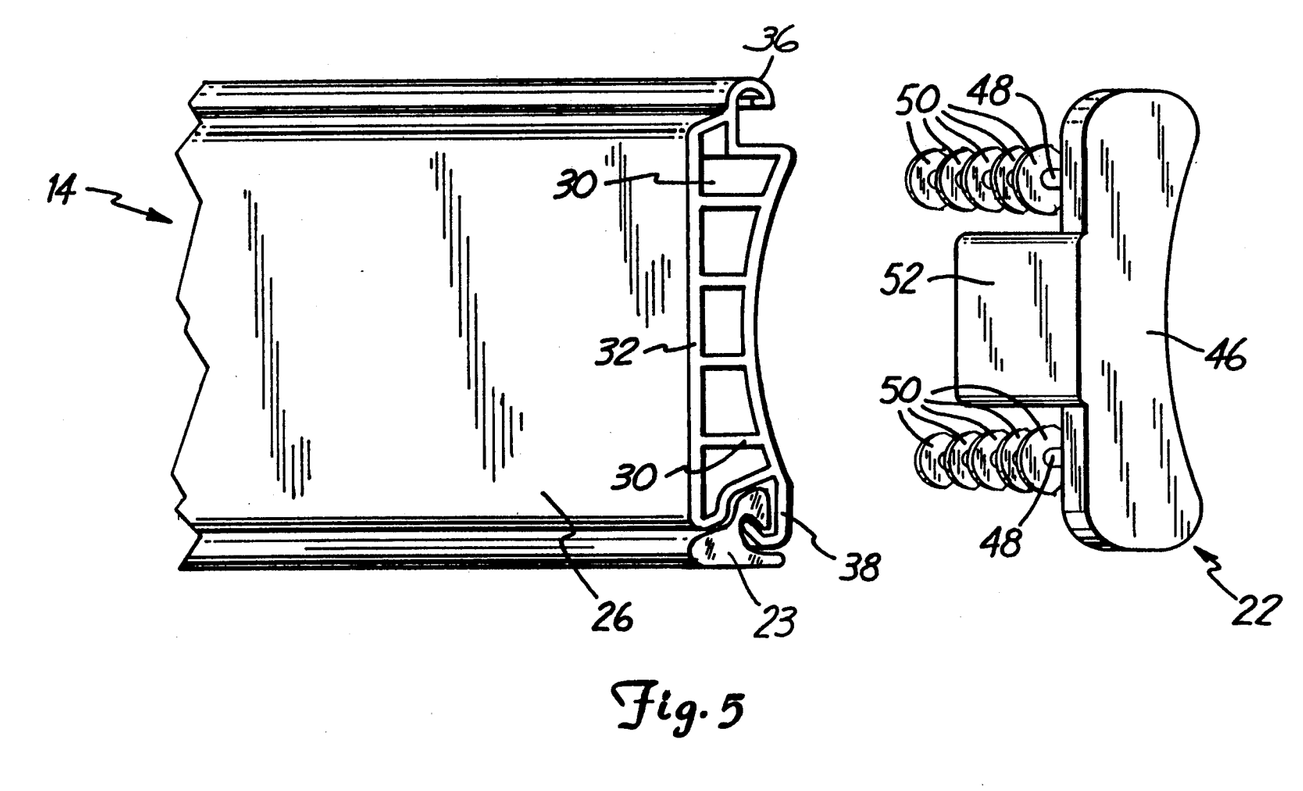
FIG. 5 is a fragmentary perspective view of a panel section located at a bottom of the articulated door of FIG. 1, the panel section has a seal inserted into a bottom receptive edge and a slider plug (shown removed from a right end of the panel section).

FIG. 5 is a fragmentary perspective view of a bottom panel section 14 that is located at a bottom end of articulated door 12. When articulated door 12 is in the closed position, as shown in FIG. 1, bottom panel section 14 is located adjacent to floor 11 of beverage body 10. Bottom panel section 14 has seal 23 inserted in bottom receptive edge 38. Seal 23 seals a gap between floor 11 of beverage body 10 and the bottom end of articulated door 12 when door 12 is in the closed position.

Also shown in FIG. 5 (removed from right end 32 of panel section 14) is slider plug 22. Slider plug 22 is formed from a low density ultra-high molecular weight polyethylene plastic and is comprised of end plate 46 and plurality of fingers 48. Each finger 48 has a plurality of deflectable retention tabs 50 positioned perpendicularly to finger 48 and parallel with the end plate 46. Slider plug 22 also includes outer surface plate 52 which extends perpendicularly from end plate 46 and is parallel with the plurality of fingers 48.

The sequence of panel sections 14 that forms articulated door 12 alternates between a first panel section and a second panel section. A slider plug 22 is positioned on right end 32 and left end 34 (shown in FIG. 3) of every first panel section in the sequence. In other words, a pair of slider plugs 22 is provided for every alternate panel section 14 in the sequence of panel sections that forms articulated door 12. Slider plug 22 is attached to an end of panel section 14 by having each of the plurality of fingers 48 of slider plug 22 placed in a parallel compartment 30, with the plurality of deflectable retention tabs 50 of each finger 48 in contact with an interior surface of the corresponding parallel compartment 30 and outer surface plate 52 extending out over flat outer surface 26 of panel section 14.

End plate 46 is large enough to partially cover top hook edge 36 and bottom receptive edge 38. This holds the articulated door together by preventing two adjacent engaged panel sections from sliding apart from each other. In the case of the bottom panel section 14 shown in FIG. 5, end plate 46 also prevents seal 23 from sliding out of bottom receptive edge 38.

Figure 6:
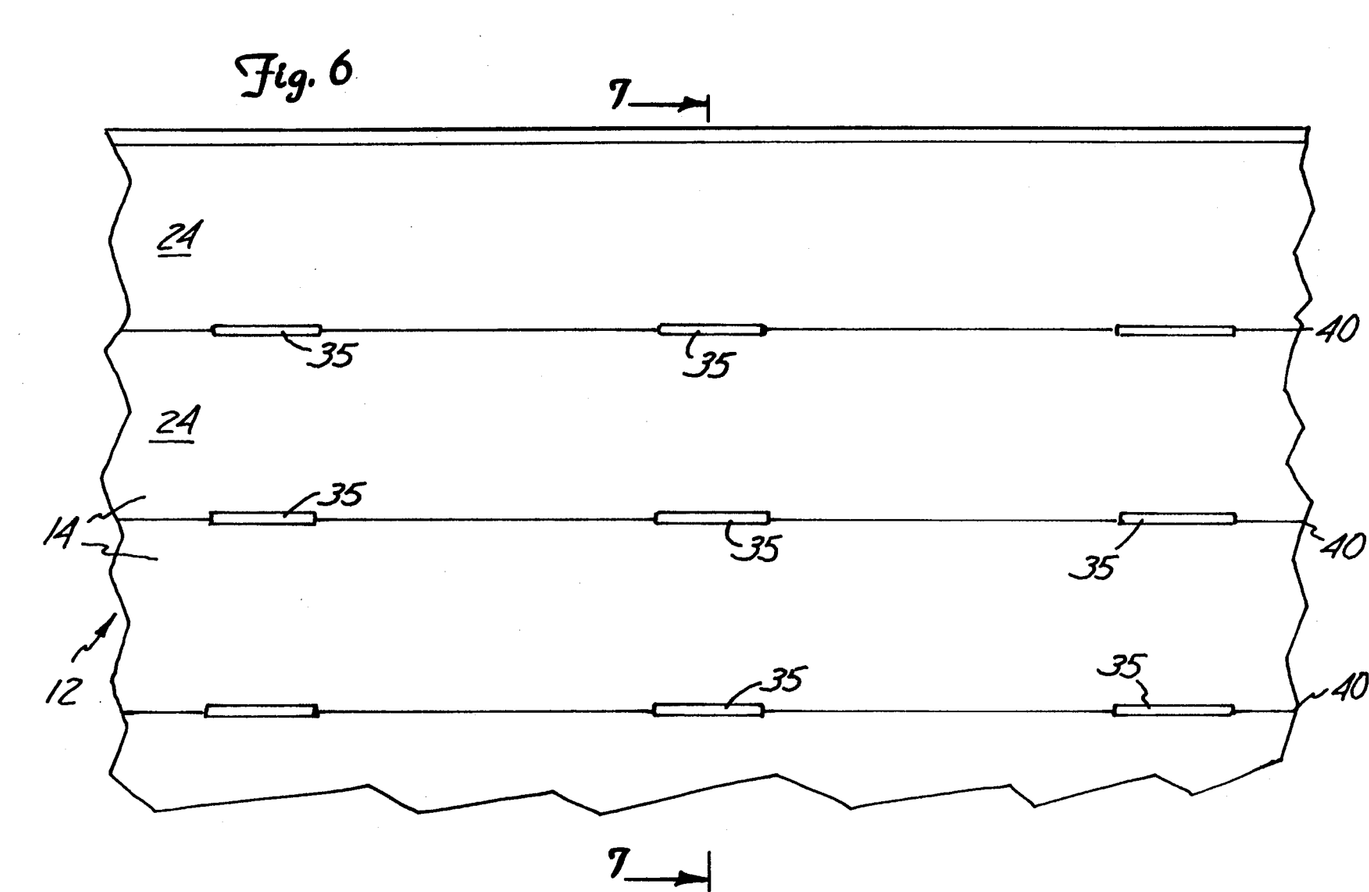
FIG. 6 is a perspective view of an articulated door having sealant segments injected between adjacent panel sections.

FIG. 6 shows an alternative embodiment of articulated door 12. In this embodiment, each hinge 40 is modified by injecting a resilient silicone rubber sealant into the hinge. Sealant segments 35 bond adjoining panel sections together, are approximately one to two inches long, and are spaced approximately fifteen inches apart. Sealant segments 35 are injected into each hinge 40 after the door is assembled and while the door is lying on a flat horizontal surface.

One advantage of applying sealant segments 35 to door 12 is that it reduces the need to provide door 12 with slider plugs 22. One function of the slider plugs is to prevent door 12 from sliding apart. Sealant segments 35 provide this function because adjoining panel sections are bonded together.

Figure 7:
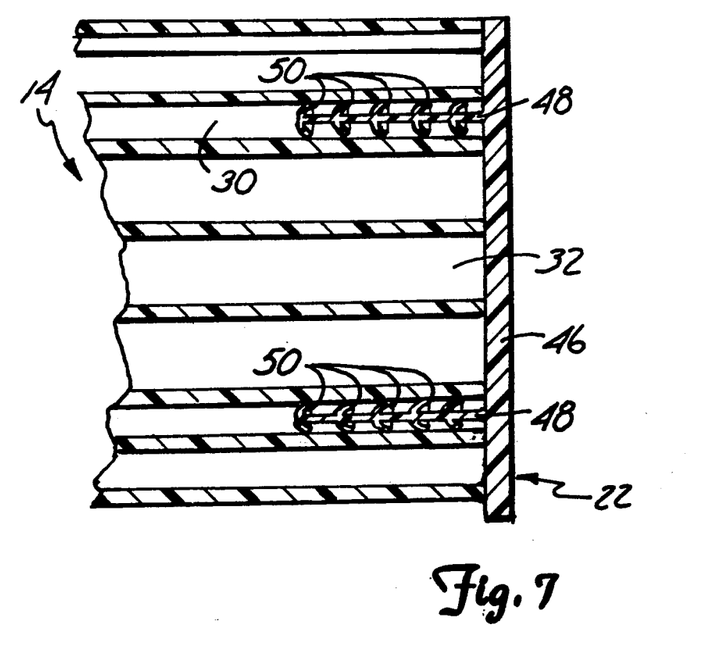
FIG. 7 is a sectional view taking along line 7—7 of FIG. 6 showing sealant segments between adjacent panel sections.

FIG. 7 is a sectional view taken along line 7—7 of FIG. 6. As seen in this Figure, sealant segments 35 will absorb vibrations. Without sealant segments 35 (as shown in FIG. 4A), there is some play in hinge 40. As a beverage body having an articulated door 12 without sealant segments 35 travels along a road, the door vibrates. Although the movement between any two panel sections may be minimal, the movement of the whole door may be substantial. However, as seen in FIG. 7, each sealant segment 35 supports the bottom receptive edge 38 of an adjoining panel section. As vibration is applied to the door, sealant segments 35 compress and expand to absorb the vibration. This also makes the door much quieter. By absorbing vibration and providing uniform spacing between adjoining panel sections, sealant segments 35 greatly reduce wear within hinge 40.

Without sealant segments 35, an articulated door 12 in the closed position exhibits a slight buckling or rippling effect. As seen in FIG. 2B, an articulated door 12 is slightly narrower than the door guiding track 16 that supports it. Individual panel sections will tend to alternate, with one panel section leaning one way and the next panel section in the sequence leaning the other way as the door collapses slightly in door guiding track 16. This creates an aesthetically unpleasing effect, especially when an articulated door 12 is provided with a beverage company's logo. Sealant segments 35 solves this problem. Because adjacent panel sections are bonded together, all the panel sections remain in-line and do not collapse. The surface of the door remains flat and the appearance of all panel sections is uniform.

Any sealant or caulking material having suitable bonding properties and resiliency can be used. In one embodiment, 73A Manus Bond Silicone Rubber Sealant, manufactured by Manus Products Co. Inc., is used to form sealant segments 35. However many other manufacturers produce similar products.

The placement of sealant segments 35 within hinge 40 effects the characteristics of articulated door 12. As more sealant is placed in the hinges, the door becomes stiffer. If too much sealant is placed in door 12, it will become difficult to move door 12 through curved section 19 of FIG. 2A. However, the hinges must be provided with enough sealant to reduce wear, prevent buckling, and absorb shock and vibration. Sealant segments approximately one to two inches long and separated by approximately fifteen inches have been found to provide the desired characteristics without making the door too stiff. Of course other dimensions which achieve the desired characteristics can be used.

Figure 8A:
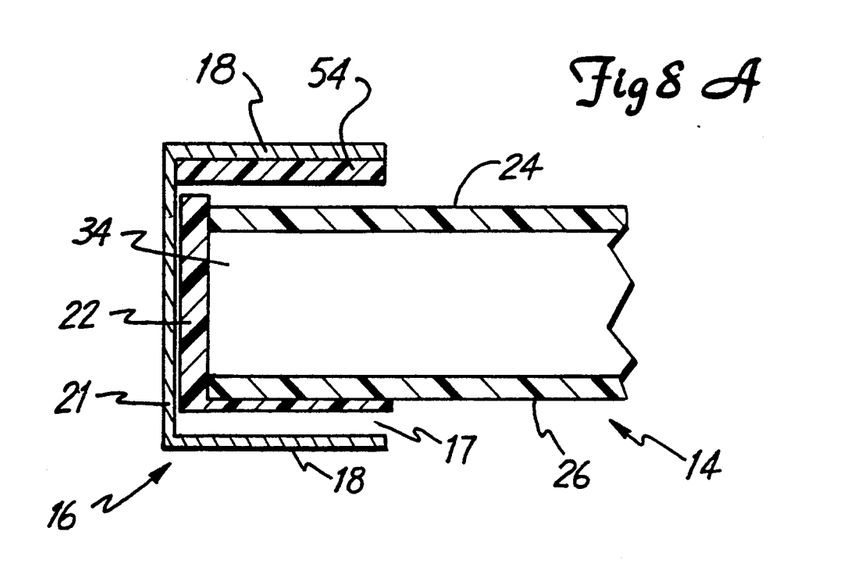
FIGS. 8A and 8B are top cutaway views taken along lines 8A—8A and 8B—8B, respectively of FIG. 1 showing panel sections inserted into door guiding tracks.

FIG. 8A is a fragmentary cutaway view showing panel section 14 and door guiding track 16 taken along line 8A—8A of FIG. 1. Door guiding track 16 includes a pair of channels 21, one of which is shown in this figure. Channel 21 includes channel members 18 facing each other across gap space 17. Panel section 14 has slider plug 22 inserted into left end 34. The distance between curved inner surface 24 and flat outer surface 26, i.e., the width of panel section 14, is preferably 0.515 inches, while the preferred width of slider plug 22 is 0.575 inches. Because slider plug 22 is wider than panel section 14, panel section 14 is not in direct contact with door guiding track 16.

In this embodiment, track liner 54 is positioned over a channel member 18 that faces curved inner surface 24 of panel section 14. Track liner 54 is formed from a high density ultra-high molecular weight polyethylene plastic. This produces a sliding, self-lubricating, plastic-on-plastic contact between slider plug 22 and track liner 54. This embodiment is used in door guiding tracks that have been converted to the present invention from door guiding tracks of the prior art.

Figure 8B:
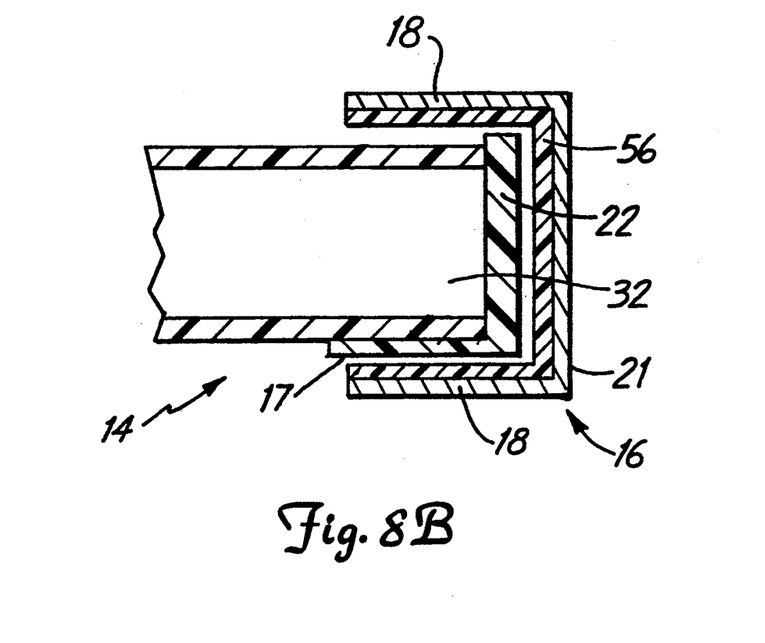

FIG. 8B is a fragmentary cutaway view showing panel section 14 and door guiding track 16 taken along line 8B—8B of FIG. 1. Right end 32 is positioned in gap space 17 of channel 21. In this embodiment, a three sided integrally formed track liner 56 is placed in channel 21. Track liner 56 is formed from a high density ultra-high molecular weight polyethylene plastic. This produces a sliding, self-lubricating, plastic-on-plastic contact between slider plug 22 and track liner 56. This embodiment is used in door guiding track of new construction.

The present invention improves the operation of articulated doors and door guiding tracks in beverage bodies by eliminating the rollers required in the prior art. The rollers are replaced by a sliding, self-lubricating, plastic-on-plastic contact that supports and guides the articulated door as it is moved between the open position and the closed position, thereby making the door less sensitive to door frame misalignment.

The articulated door of the present invention will last longer than articulated aluminum doors of the prior art. The plastic-on-plastic contact in the hinges that connect adjacent panel sections can outwear the aluminum-on-aluminum contact in the hinges of the prior art by a factor of approximately 6 to 1. Although both plastic and aluminum can be steam cleaned, any salt, sand, or dirt that gets into an aluminum hinge will take a toll in wear and corrosion before it can be removed. In contrast, when a plastic hinge is steam cleaned and the salt, sand, and dirt are removed, the underlying plastic surfaces of the hinge are left largely unaffected because the plastic used in the present invention is highly corrosion resistent and wear resistent.

The articulated door of the present invention weighs less the one-half the weight of articulated aluminum doors of the prior art. This results in a weight reduction of more than 500 pounds in a typical beverage body. In addition, because of the door's light weight, the counterbalance used in articulated aluminum doors of the prior art may not be needed, further decreasing the cost and weight of the beverage body.

Compared to aluminum, which is highly thermoconductive, the plastic used to form the articulated door of the present invention has a very high insulation value. While an articulated aluminum door of the prior art will require a layer of insulation to be attached for use in cold climates, the articulated door of the present invention probably will not require additional insulation. However, if additional insulation is required, foam insulation can be placed inside the plurality of compartments of the panel sections to increase the insulation value of the door.

The articulated door of the present invention is resilient; articulated aluminum doors of the prior art are not. The door is much less likely to be damaged from impacts and collisions than are aluminum doors of the prior art. If the door is impacted, the panel sections probably will not break, but instead may pop out of the door guiding track and the hinges that connect the panel sections to adjacent panel sections. Most likely the panel sections will not be damaged and the door can be reassembled.

Although the present invention has been described with reference to preferred embodiments, workers skilled in the art will recognize that changes may be made in form and detail without departing from the spirit and scope of the invention.

What is claimed is:

1. A beverage body for transporting beverages, the beverage body comprising:
   a floor;
   a roof;

a plurality of exterior walls intermediate to the floor and the roof;

a door opening in one of the exterior walls;

a left channel having a section positioned along a left side of the door opening connected by a curved section to a section positioned along the roof;

a right channel having a section positioned along a right side of the door opening connected by a curved section to a section positioned along the roof, wherein the left channel and the right channel form a door guiding track;

an articulated door slidably positioned in the door guiding track, the articulated door comprising:

a plurality of polymeric panel sections connected together such that a hinge is formed between adjacent panel sections, wherein the hinge allows the adjacent panel sections to be positioned at varying angles with respect to each other; each panel section having a left end extending into and guided by the left channel and a right end extending into and guided by the right channel; and resilient bonding means positioned at the hinges for absorbing vibration and preventing the adjacent panel sections from sliding apart, the resilient bonding means being positioned between and bonding together the adjacent panel sections while permitting the adjacent panel sections to be positioned at varying angles with respect to one another.

2. The beverage body of claim 1 wherein each panel section comprises:

an outer surface;

an inner surface;

a plurality of partitions connecting the outer surface to the inner surface and separating a space between the outer surface and the inner surface into a plurality of compartments;

a top hook edge positioned adjacent to the outer surface and the inner surface and connecting the left end to the right end; and a bottom receptive edge positioned opposite the top hook edge, adjacent to the outer surface and the inner surface and connecting the left end to the right end, for engaging a top hook edge of a panel section immediately below the bottom receptive edge to form the hinge between the panel sections, the top hook edge of the panel section immediately below being positioned generally within the bottom receptive edge when the adjacent panel sections are engaged to form the hinge.

3. The beverage body of claim 1 wherein the resilient bonding means is silicone rubber sealant.

4. The articulated door system of claim 1 wherein the resilient bonding means comprises a plurality of resilient bonding segments spaced along each of the hinges.

5. The articulated door system of claim 4 wherein the resilient bonding segments having a length of about 1-2 inches.

6. The articulated door system of claim 5 wherein the resilient bonding means are spaced longitudinally from one another along the hinges by about 15 inches.

7. The articulated door system of claim 4 wherein the resilient bonding segments are a silicone rubber material.

8. An articulated door system comprising:

a door guiding track formed by a left channel, part of which is positioned along a left side of a door opening, and a right channel, part of which is positioned along a right side of the door opening; and an articulated door slidably positioned in the door guiding track, the articulated door comprising:

a plurality of polymeric panel sections connected together in an alternating sequence of first and second panel sections such that a hinge is formed between each of the first and second panel sections; and resilient bonding means at the hinges for absorbing vibration and preventing the panel sections from sliding apart, wherein the hinges and the resilient bonding means allow each first panel section to be positioned at varying angles with respect to each second panel section, the resilient bonding means being positioned between and bonding together the panel sections while permitting the panel sections to be positioned at varying angles with respect to one another.

9. The articulated door system of claim 8 wherein the resilient bonding means is silicone rubber sealant.

10. The articulated door system of claim 8 wherein the resilient bonding means comprises a plurality of resilient bonding segments spaced along each of the hinges.

11. The articulated door system of claim 10 wherein the resilient bonding segments have a length of about 1-2 inches.

12. The articulated door system of claim 11 wherein the resilient bonding means are spaced longitudinally from one another along the hinges by about 15 inches.

13. The articulated door system of claim 12 wherein the resilient bonding segments are a silicone rubber material.

* * * * *